United States Patent [19]

Van Pelt et al.

[11] 3,713,606

[45] Jan. 30, 1973

[54] MAGNETIC TAPE UNIT CAPSTAN AND REEL MOTOR CONTROL APPARATUS

[75] Inventors: Richard W. Van Pelt; Allen J. Werner, both of Boulder, Colo.

[73] Assignee: International Business Machine Corporation, Armonk, N.Y.

[22] Filed: Jan. 25, 1971

[21] Appl. No.: 109,404

[52] U.S. Cl. ......................242/184, 226/42, 226/97, 242/186, 242/209

[51] Int. Cl. ...G11b 15/58, G11b 15/46, B65h 23/18

[58] Field of Search......242/184, 183, 182, 185, 206, 242/208, 209, 210, 201, 202, 203, 204; 226/118, 97, 95, 42

[56] References Cited

UNITED STATES PATENTS

| | | | |
|---|---|---|---|
| 3,433,427 | 3/1969 | Brown et al. | 226/97 X |
| 3,304,018 | 2/1967 | Kurth | 242/184 |

*Primary Examiner*—George F. Mautz
*Attorney*—Hanifin & Jancin and F. A. Sirr

[57] ABSTRACT

A magnetic tape unit wherein high speed tape movement, for example bidirectional high speed search or unidirectional high speed rewind is achieved at the maximum possible tape speed by means of apparatus which controls the speed of the capstan in accordance with the speed of the slowest reel motor.

The magnetic tape unit includes a single capstan, a file reel, a machine reel, a file vacuum column disposed between the capstan and the file reel, and a machine vacuum column disposed between the capstan and the machine reel.

Each vacuum column includes two spaced sensors to divide the column into three zones. The sensors provide discrete outputs indicative of the zone position of the tape loop in each column.

Three digital tachometers sense the tape speed at the capstan and at the side of each column adjacent a reel. The output of each reel tachometer is continuously compared to the output of the capstan tachometer to originate a binary output signal have a "reel-fast" or a "reel-slow" state.

The reel motor and the capstan motor are controlled by (1) the column sensors in accordance with tape loop zone position and (2) the "reel-fast" or "reel-slow" signal, to run the capstan at its maximum possible speed when both reel motors are capable of moving the tape at this same speed, and to operate the capstan in a drive-coast mode if one or both of the reel motors are slow, the drive-coast mode then being controlled by the slowest reel motor.

At the end of the rewind, a machine reel radius sensor causes both reel motors to be placed in a brake mode, and the capstan motor to be placed in a coast mode. If one motor has a weak braking effect, the speed of this particular motor controls the capstan in a coast-drive mode and the other reel motor is placed in a brake-coast mode under control of this weaker motor.

14 Claims, 11 Drawing Figures

INVENTORS
RICHARD W. VAN PELT
ALLEN J. WERNER
BY
ATTORNEY

FIG. 2

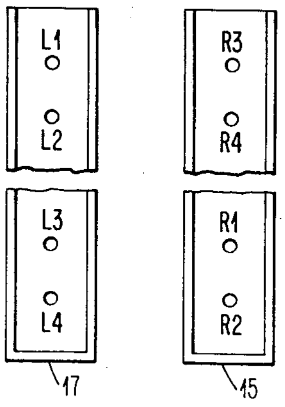

FIG. 7

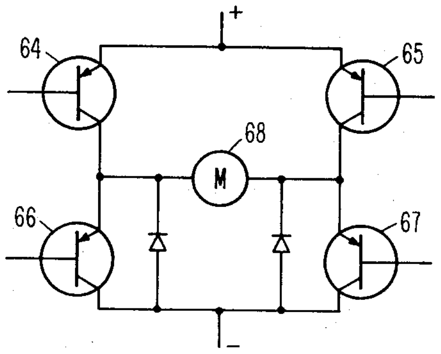

FIG. 3

| | MACHINE REEL COLUMN | | | | FILE REEL COLUMN | | | | |
|---|---|---|---|---|---|---|---|---|---|
| | MACHINE REEL SLOW | | MACHINE REEL FAST | | FILE REEL SLOW | | FILE REEL FAST | | |
| LOOP POS | REEL MOTOR | CAP MOTOR | REEL MOTOR | CAP MOTOR | REEL MOTOR | CAP MOTOR | REEL MOTOR | CAP MOTOR | LOOP POS |
| ABOVE L1 | ↓ | C | ↓ | ↑ | | | | | |
| L1-L2 | ↓ | ↑ | C | ↑ | | | | | |
| BELOW L2 | B | ↑ | B | ↑ | B | ↓ | B | ↓ | ABOVE R1 |
| | | | | | ↑ | ↓ | C | ↓ | R1-R2 |
| | | | | | ↑ | C | ↑ | ↓ | BELOW R2 |

KEY: ↓ = DRIVE MOTOR IN A DIRECTION TO MOVE TAPE INTO COLUMN

↑ = DRIVE MOTOR IN A DIRECTION TO MOVE TAPE FROM COLUMN

B = BRAKE

C = COAST

FIG. 4

| | MACHINE REEL COLUMN | | | | FILE REEL COLUMN | | | | |
|---|---|---|---|---|---|---|---|---|---|
| | MACHINE REEL SLOW | | MACHINE REEL FAST | | FILE REEL SLOW | | FILE REEL FAST | | |
| LOOP POS | REEL MOTOR | CAP MOTOR | REEL MOTOR | CAP MOTOR | REEL MOTOR | CAP MOTOR | REEL MOTOR | CAP MOTOR | LOOP POS |
| ABOVE L1 | ↓ | C | ↓ | C | | | | | |
| L1-L2 | C | C | B | C | | | | | |
| BELOW L2 | B | C | B | ↑ | B | C | B | ↓ | ABOVE R1 |
| | | | | | C | C | B | C | R1-R2 |
| | | | | | ↑ | C | ↑ | C | BELOW R2 |

FIG. 5

| | MACHINE REEL COLUMN | | | | FILE REEL COLUMN | | | | |
|---|---|---|---|---|---|---|---|---|---|
| | MACHINE REEL SLOW | | MACHINE REEL FAST | | FILE REEL SLOW | | FILE REEL FAST | | |
| LOOP POS | REEL MOTOR | CAP MOTOR | REEL MOTOR | CAP MOTOR | REEL MOTOR | CAP MOTOR | REEL MOTOR | CAP MOTOR | LOOP POS |
| | | | | | ↓ | C | ↓ | ↑ | ABOVE R3 |
| | | | | | ↓ | ↑ | C | ↑ | R3-R4 |
| ABOVE L3 | B | ↓ | B | ↓ | B | ↑ | B | ↑ | BELOW R4 |
| L3-L4 | ↑ | ↓ | C | ↓ | | | | | |
| BELOW L4 | ↑ | C | ↑ | ↓ | | | | | |

FIG. 6

| | MACHINE REEL COLUMN | | | | FILE REEL COLUMN | | | | |
|---|---|---|---|---|---|---|---|---|---|
| | MACHINE REEL SLOW | | MACHINE REEL FAST | | FILE REEL SLOW | | FILE REEL FAST | | |
| LOOP POS | REEL MOTOR | CAP MOTOR | REEL MOTOR | CAP MOTOR | REEL MOTOR | CAP MOTOR | REEL MOTOR | CAP MOTOR | LOOP POS |
| | | | | | ↓ | C | ↓ | C | ABOVE R3 |
| | | | | | C | C | B | C | R3-R4 |
| ABOVE L3 | B | C | B | ↓ | B | C | B | ↑ | BELOW R4 |
| L3-L4 | C | C | B | C | | | | | |
| BELOW L4 | ↑ | C | ↑ | C | | | | | |

FIG. 8

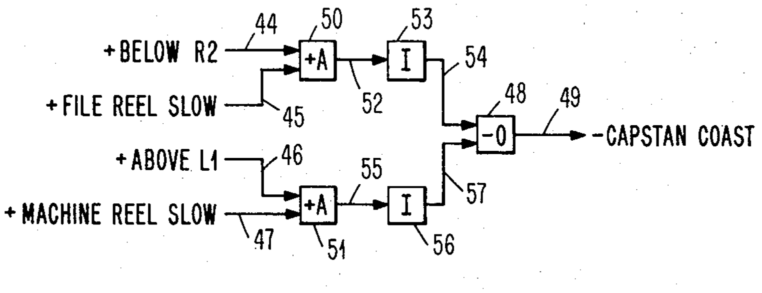

FIG. 9

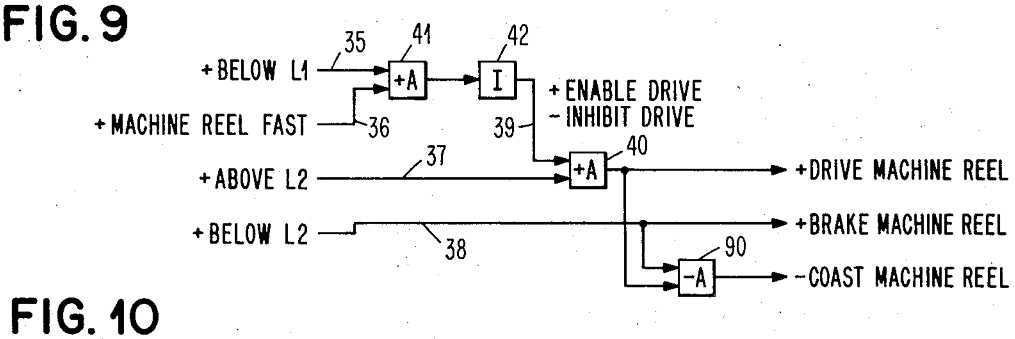

FIG. 10

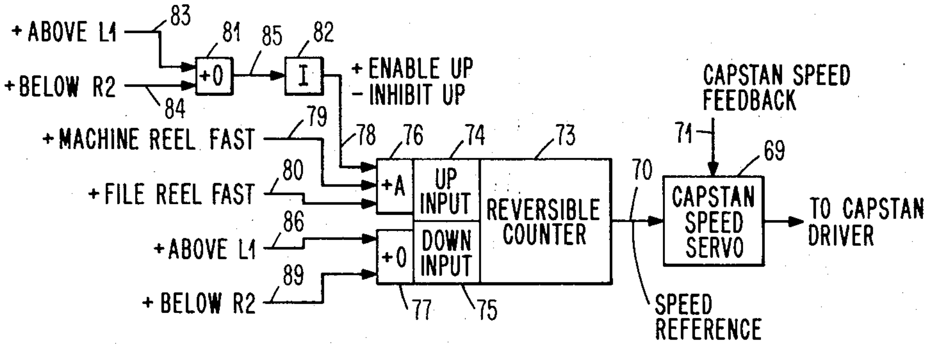

FIG. 11

| | MACHINE REEL COLUMN | | | | FILE REEL COLUMN | | | | |
|---|---|---|---|---|---|---|---|---|---|
| | MACHINE REEL SLOW | | MACHINE REEL FAST | | FILE REEL SLOW | | FILE REEL FAST | | |
| LOOP POS | REEL MOTOR | CAP MOTOR | REEL MOTOR | CAP MOTOR | REEL MOTOR | CAP MOTOR | REEL MOTOR | CAP MOTOR | LOOP POS |
| ABOVE L1 | ↓ | R | ↓ | R | | | | | |
| L1-L2 | ↓ | M | C | I | | | | | |
| BELOW L2 | B | M | B | I | B | M | B | I | ABOVE R1 |
| | | | | | ↑ | M | C | I | R1-R2 |
| | | | | | ↑ | R | ↑ | R | BELOW R2 |

KEY:
I = INCREASE CAPSTAN SPEED REFERENCE ONE STEP IF BOTH REELS ARE FAST
M = MAINTAIN CAPSTAN SPEED REFERENCE
R = REDUCE CAPSTAN SPEED REFERENCE ONE STEP

MAGNETIC TAPE UNIT CAPSTAN AND REEL MOTOR CONTROL APPARATUS

BACKGROUND AND SUMMARY OF THE INVENTION

Single-capstan magnetic tape units are known in which the tape is in continuous engagement with the capstan and the capstan is directly connected to a reversible low inertia motor, usually a DC motor. The capstan is disposed between two tape buffers, for example, vacuum columns. A reel of tape is positioned on the other side of each vacuum column to feed tape into a column. The replaceable reel is known as a file reel, thus giving the associated column the name file column. The permanent reel is known as a machine reel, giving the associated column the name machine column. Each reel is connected to a relatively high inertia reversible motor, usually a DC motor.

These prior art tape units are characterized in that tape movement is controlled by the capstan. As the capstan rotates, tape is withdrawn from one column and fed into the other column. Each column includes a number of tape loop sensors which are spaced apart in the column, to establish zones within the column. The sensors respond to discrete changes in the zone position of the loop. These sensors are connected to control the associated reel motor, to maintain an optimum length tape loop in each column. Generally, it is desirable to maintain a short loop in the column from which the capstan is withdrawing tape, and a longer loop in the column into which the capstan is feeding tape.

The present invention relates to the above described class of magnetic tape units, and particularly to an improved means of capstan and reel motor control for high speed movement of the tape, as in bidirectional high speed search or unidirectional rewind.

High speed tape movement is to be distinguished from the lower speed movement which occurs during a data processing operation. During this lower speed movement the capstan motor is controlled to run at a constant speed, data is processed in either a read or a write operation, and the reel motors are controlled to maintain the above described optimum loop lengths in each column. During high speed movement, the read/write recording transducer may be searching for a given data block, or the transducer may be inactive as the tape is rewound from the machine reel to the file reel.

Prior art capstan and reel motor control systems are known wherein, upon the occurrence of a command for high speed tape movement, the two reel motors and the capstan motor receive full energization. This, of course, causes the low inertia capstan motor to quickly outrun the high inertia reel motors, with the result that the tape loops in the buffer columns vary from the desired length. As a result, the column sensors are then effective to control the capstan motor to brake the motor, causing it to slow down. The capstan motor then operates in a drive-brake mode, allowing the reel motors to come up to speed. This mode of capstan control is achieved only by virtue of a change in the tape loop from one discrete zone to the other. Once the required high speed is reached, the capstan speed is controlled at a high speed and the energization of the reel motors is controlled by the column sensors in accordance with the loop lengths.

With this prior art structure, accurate reel motor control requires a large number of loop position sensors to divide the column into many small zones, each of which is responsive to the presence or absence of the tape loop therein.

The present invention improves the prior art reel and capstan motor control systems in that the present invention provides on-off control systems which require a minimum number of zones in the columns and utilizes an essentially continuous signal indicative of the direction in which the loop length is changing, to provide a simple and more accurate control system capable of driving the slowest of the three motors at very nearly a 100 percent duty cycle, the other motors being driven at less than a 100 percent duty cycle, to thus achieve the fastest possible rewind with a particular combination of the three motors.

Specifically, the present invention utilizes discrete zone signals indicative of the tape quantity or loop length in each buffer or column, and further utilizes continuous signals indicative of the direction in which the tape quantity is changing, namely, is the quantity of tape in a buffer increasing or is it decreasing. This last mentioned signal is preferably obtained by the use of three low inertia digital tachometers. One tachometer is driven by the capstan and, since minimal tape slip is assumed, the output of this tachometer is a measure of tape speed at the capstan side of each column. The other two tachometers are positioned one adjacent each reel-side of a column, to be driven by the tape as it leaves or enters its reel. Comparators are provided to compare each reel tachometer to the capstan tachometer, to thereby originate a "reel-fast" or a "reel-slow" signal for each of the two reels. These signals are compared to a signal indicating direction of capstan rotation and a logical decision is made as to whether the quantity of tape in a buffer is increasing or decreasing.

This quantity-change signal is connected in controlling relation to the reel motors and the capstan motor to control the slowest of the three motors at approximately a 100 percent drive duty cycle, and to control the other two motors at somewhat less than a 100 percent drive on-of duty cycle.

An additional feature of the present invention relates to a modification of the control of these three motors as the terminal portion of rewind occurs. This terminal portion is sensed by means of a radius sensor which provides an output when the quantity of tape on the machine reel decreases to a given level. The occurrence of this level causes the mode of reel motor control to be changed to dynamic brake, and the mode of capstan motor control to be changed to coast. Since the reel motors and their load are of a relatively high inertia, these motors will normally not slow down as fast as the capstan motor. Also, one reel motor may have a weak dynamic braking effect, causing that motor to have the poorer slow-down characteristics. The above-mentioned signals are now utilized to maintain the desired loop length in each column by controlling the capstan motor in a coast-drive mode, to compensate for the reel motor having the weak braking effect.

In a modified form of the present invention, the capstan motor control logic is constructed and arranged so as to incrementally advance the capstan speed, during the initial portion of rewind, each time that the tape speed at both reels is at least equal to the capstan speed. When the capstan speed has been incremented to so high a speed that one or both of the reel motors can no longer keep up, and thus the tape loop in an associated vacuum column moves to an undesirable zone, the capstan speed is decremented.

The foregoing and other features and advantages of the invention will be apparent from the following more particular description of preferred embodiments of the invention, as illustrated in the accompanying drawings.

BRIEF DESCRIPTION OF THE DRAWINGS

FIG. 2 is a showing of the vacuum column portion of FIG. 1, wherein two position sensors have been added to each column, to facilitate high speed bidirectional search, FIG. 3 is a table which describes the operation of the apparatus of FIG. 1 during the initial period and the intermediate period of high speed rewind, or backward high speed search, and relates the control order of the machine reel motor, the file reel motor and the capstan motor to the column positions of the two tape loops and to the outputs of the two frequency comparators, FIG. 4 is a table similar to that of FIG. 3, describing the operation during the terminal period of rewind or backward high speed search, as instituted by the machine reel tape radius sensor of FIG. 1, FIG. 5 is a table similar to the table of FIG. 3, which describes the operation of the apparatus of FIG. 1, when using the column structure of FIG. 2 to achieve the initial period and the intermediate period of forward high speed search, FIG. 6 is a table similar to the table of FIG. 4, which describes the operation of the apparatus of FIG. 1, when using the column structure of FIG. 2, to achieve the terminal period of forward high speed search, FIG. 7 is an exemplary showing of a four transistor switching network of the type which may be utilized as the three on-off motor driver circuits of FIG. 1, FIG. 8 is an exemplary showing of a portion of the capstan motor control logic of FIG. 1 which may be utilized to achieve backward high speed search or rewind, FIG. 9 is an exemplary showing of a portion of the machine reel motor control logic of FIG. 1 also for backward operation, FIG. 10 is an exemplary showing of a portion of a modified form of capstan motor control logic which may be used in the apparatus of FIG. 1 for backward operation, and FIG. 11 is a table which describes the operation of the apparatus of FIG. 1 when using the capstan motor control logic of FIG. 10 for backward operation.

DESCRIPTION OF THE PREFERRED EMBODIMENTS

Figure 1:
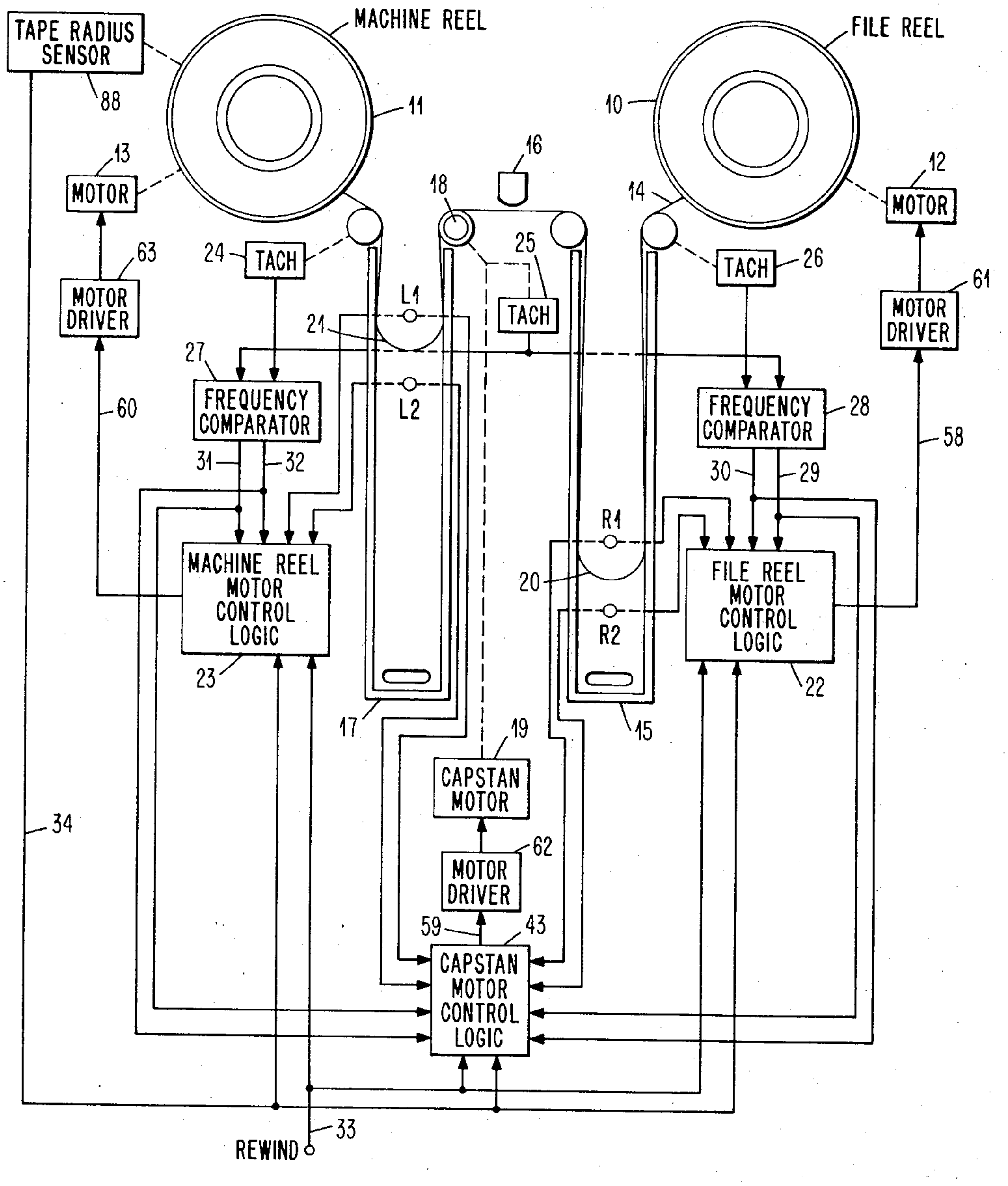
FIG. 1 is a diagrammatic showing of a magnetic tape unit utilizing the present invention to achieve high speed rewind.

In describing this invention, the terms brake and coast are used. The term brake is to be construed to include reverse energization, or plugging, as well as mechanical or dynamic braking. The term coast is to be construed as any mode of operation which either maintains existing speed subject to frictional deceleration, or if normal deceleration is not adequate, a gentle braking action could be used.

The following description utilizes exemplary showings of certain structural devices as an aid in the understanding of the preferred embodiments of the present invention. For reasons of clarity, other devices are not shown in detail, since these devices, and their various forms, are well known to those of normal skill in the art.

FIG. 1 is a diagrammatic showing of a magnetic tape unit utilizing the present invention. File reel 10 is a removable reel, usually containing 2400 feet of ½ inch wide magnetic tape, whereas machine reel 11 remains permanently in place on the tape unit. Each of these reels is reversibly driven by direct current motors 12 and 13 respectively. These motors, while being capable of delivering high torque, have relatively high inertia and thus slow response times.

During data processing, magnetic tape 14 can be moved in either a forward or a reverse direction at a uniform speed of, for example, 200 inches per second. As tape moves in a forward direction, it first leaves reel 10, forms a loop in file vacuum column 15, passes processing station 16 (including a read/write head, tape cleaner, guides, and the like) forms another loop in machine vacuum column 17, and is accumulated on reel 11. The movement of tape is controlled by capstan 18 which continuously engages the tape and is reversibly driven by direct current motor 19. This motor is preferably a high performance printed circuit motor having low inertia and fast response times.

Each of the vacuum columns includes two discrete position sensors, identified as R1, R2, L1 and L2. These sensors may, for example, be pressure sensitive switches, as is well known in the art. These sensors divide the vacuum column into three discrete zones. Considering column 15, the zones are "above R1," "R1–2" and "below R2."

Considering FIG. 2, where selective high speed tape movement in either direction for high speed search is desired, the two columns include additional sensors L3, L4 and R3, R4, to establish three zones associated with each of these groups of two sensors.

The structure thus far described is a conventional single capstan magnetic tape unit utilizing vacuum column tape buffers to isolate the high inertia reel environment from the low inertia capstan environment.

The present invention relates to the high speed mode of operation of a magnetic tape unit, such as the high speed search or rewind. During high speed movement, the tape moves at a high speed, for example 800 inches per second.

High speed movement of the tape while searching for a given data block requires the capability of moving tape bidirectionally at high speed. Forward high speed search is accomplished by high speed forward rotation of capstan motor 19 and reel motors 12 and 13, whereas backward high speed search is identical to high speed rewind and is accomplished by high speed reverse rotation of these motors.

Backward high speed search and rewind differ only in the terminal portion of movement. In rewind, the terminal portion is instituted by sensing the quantity of tape remaining in the machine reel, whereas in search the terminal portion is instituted by sensing that the desired data block on tape is imminent.

FIGS. 2, 5 and 6 disclose the structure of the present invention which provides forward high speed search. In order to simplify the description of the present invention, high speed rewind, which is equivalent to backward high speed search except for the terminal portion, will be described in detail. Forward high speed search will not be described in detail. However, the teachings of FIGS. 2, 5 and 6, coupled with the following description, will make this mode of operation of the present invention abundantly clear.

As will be apparent, backward high speed search and rewind utilize sensors L1, L2, R1 and R2, whereas forward high speed search utilizes sensors L3, L4, R3 and R4, as shown in FIGS. 2, 5 and 6.

Proceeding now to a description of high speed rewind, this mode of operation is accomplished by instituting high speed reverse rotation of capstan motor 19 and reel motors 12 and 13.

As can be seen upon reference to FIG. 3, the reel motors are controlled to assume a drive, a brake or a coast mode of operation by motor control logic networks 22 and 23 which compare two signals: (1) the zone position of tape loops 20 and 21 in file vacuum column 15 and machine vacuum column 17, and (2) a comparison of the tape speed at the capstan side of a vacuum column to the tape speed at the reel side of each vacuum column, these comparisons being indications of the direction of movement of the tape loop in each column. The capstan motor is normally in a drive mode of operation but can be switched to a coast mode by the same signals. The slower reel motor has the effect of controlling the capstan speed. If the top speed of the capstan is less than that of either reel, the capstan has the effect of controlling the speed of both reels. If the file reel cannot accelerate as fast as the machine reel, the file reel tape loop will oscillate about sensor R2, thereby forcing the capstan to follow the tape speed of the file reel very closely by running in a drive-coast mode. The file reel operates at nearly 100 percent drive duty cycle in this case. At the same time, the machine reel is able to match file reel speed with less than 100 percent duty cycle, with the result that the machine column loop oscillates about sensor L2 while the machine reel motor runs in a drive-coast-brake mode. Thus, in this case, the file reel motor is the "weaker" of the two reel motors.

When the file reel is able to keep up with the capstan with less than a 100 percent duty cycle, the file column tape loop oscillates about sensor R1, the file reel motor runs in a drive-brake-coast mode, and the capstan operates with a 100 percent duty cycle.

Similarly, when the machine reel begins to require nearly 100 percent duty cycle to keep up with the capstan, as can occur in a normal rewind because of reduction in tape radius on the machine reel, the machine column loop oscillates about sensor L1, and the machine reel operates at nearly 100 percent drive duty cycle. The capstan speed is adjusted to follow the speed of the lagging reel.

As can be seen from FIG. 3, the capstan motor is always energized, to move tape from the machine column and to move tape into the file column, so long as one of the reel motors is not slow and the corresponding tape loop is not in an undesirable zone. For example, when the tape loop in the machine column is in the zone above sensor L1 the capstan motor undergoes a transition from drive to coast when the tape speed adjacent the machine reel undergoes a transition from being faster than the tape speed adjacent the capstan to being slower than the capstan tape speed, this indicating that the tape loop is now moving up in the column.

Each reel motor will be in a drive mode, irrespective of the direction of movement of the loop, so long as its tape loop is in a given zone, this being the zone above L1 for the machine reel motor and below R2 for the file reel motor. However, when the tape loop is in the intermediate zone in a column, the mode of operation of the associated reel motor depends upon the direction in which the tape loop is traveling. For example, when the tape loop is moving down in the file column, the file reel motor is in a drive mode, and when the direction of loop travel reverses to up, the file reel motor is placed in a coast mode of operation. Also, FIG. 3 shows that each reel motor will be in a brake mode, irrespective of the direction of movement of the loop, so long as its tape loop is in a given zone, this being the zone below L2 for the machine reel motor and the zone above R1 for the file reel motor.

Three digital tachometers 24, 25 and 26 are associated with the tape to provide variable frequency outputs which increase in frequency as the tape speed increases. Tachometers 24 and 26 sense the speed of the tape on the reel side of each vacuum column, whereas tachometer 25 senses the tape speed on the capstan side of each column. Frequency comparators 27 and 28 provide a "reel-fast" or a "reel-slow" output when the speed of the tape at tachometers 24 or 26 is faster or slower than the tape speed at capstan 18.

The frequency comparators can be selected from a variety of such devices well known to those skilled in the art. The structural cooperation provided by the present invention allows the use of a simple comparator which allows a reel-fast or a reel-slow output to exist during the transient intervals in which the two frequency inputs are in fact equal. More specifically, the outputs of comparators 27 and 28 are binary in nature. When the tape speed at reel 10 is higher than the tape speed at capstan 18, conductor 29 is positive and conductor 30 is negative, and a reel-fast output exists. When the tape speed at reel 10 is lower than that of the capstan, conductor 29 is negative and conductor 30 is positive. Thus, positive on conductor 29 is a reel-fast output from comparator 28, and positive on conductor 30 is a reel-slow output. Similar reasoning applies to comparator 27, where positive on conductor 31 is a reel-fast output and positive on conductor 32 is a reel-slow output.

The reel motor control logic networks 22 and 23 receive input signals from comparators 28 and 27 respectively, from the loop position sensors associated with the file column and the machine column respectively, from conductor 33 whose output indicates that the magnetic tape unit is in a rewind mode of operation, and from conductor 34 whose output indicates that the rewind operation is in its terminal portion, as will be later described. All of these signals are binary in nature. The combinational logic circuits chosen by those of ordinary skill in the art to accomplish the control order defined in FIG. 3 may take many forms. FIG. 9 is an exemplary showing of the manner in which the modes of operation drive, coast or brake may be instituted for machine reel motor 13 in accordance with these binary input signals.

Referring to FIG. 9, input signal conductors 35, 36, 37 and 38 have a positive voltage thereon when the following conditions exist: conductor 35 is positive when the tape loop in machine column 17 is below L1; conductor 36 is positive when output conductor 31 of frequency comparator 27 is positive, indicating that the machine reel is fast and that the tape loop in the machine column is therefore moving in a downward direction; conductor 37 is positive when the tape loop in machine column 17 is above sensor L2; and conductor 38 is positive when the tape loop in the machine column is below sensor L2.

In accordance with the requirements of FIG. 3, whenever conductor 38 is positive, a brake mode of operation for motor 13 is instituted.

Whenever the tape loop is in the intermediate zone L1–L2, conductor 37 is positive. However, in accordance with the requirements of FIG. 3, motor 13 may be either in a drive mode of operation or a coast mode of operation. The particular mode is selected by the input provided on conductor 39 to positive AND gate 40. Whenever conductor 39 is positive, a drive mode of operation is enabled. When conductor 39 is negative, a drive mode is inhibited. When the tape loop is in intermediate zone L1–L2, FIG. 3 requires a coast when the machine reel is fast. Thus, conductor 38 is negative, the output of AND gate 40 is negative, negative AND gate 90 is enabled and its output institutes a coast mode of operation. The polarity of the signal on conductor 39 is determined by positive AND gate 41 and inverter 42. The two inputs to AND gate 41 are conductors 35 and 36. When the tape loop in column 17 is below sensor L1 and output conductor 31 of frequency comparator 27 is positive, the output of AND gate 41 is positive. This output is inverted to produce a negative signal on conductor 39, thus instituting a coast mode of operation for motor 13, as required by FIG. 3. However, when the tape loop in column 17 is above sensor L1, irrespective of the output of frequency comparator 27, the output of AND gate 41 is negative. This output is inverted by inverter 42 and a positive voltage on conductor 39 is ANDed with a positive voltage on conductor 37 to provide a positive output from AND gate 40, thus instituting a drive mode of operation of motor 13.

FIG. 9 does not depict the entire combinational logic arrangement of machine reel motor logic control network 23. However, the explanation of the structure shown in FIG. 9 makes it abundantly clear that many combinational logic networks can be provided to satisfy the requirements of FIG. 3 and, for purposes of clarity, a complete combinational logic circuit is not shown.

The mode of operation of capstan motor 19 is controlled by capstan motor control logic network 43 which receives the same input signals as are received by the reel motor control logic networks 22 and 23. FIG. 8 discloses a simple form of combinational logic which satisfies a portion of the requirements of FIG. 3. In FIG. 8, input conductors 44, 45, 46 and 47 are positive when the following conditions exist: conductor 44 is positive when the tape loop in file column 15 is below sensor R2; conductor 45 is positive when output conductor 30 of frequency comparator 28 is positive, thus indicating that a tape speed adjacent file reel 10 is slower than the tape speed adjacent capstan 18, this being indicative of the fact that the loop of tape in column 15 is moving in a downward direction; conductor 46 is positive when the loop of tape in machine column 17 is above sensor L1; and conductor 47 is positive when output conductor 32 of frequency comparator 27 is positive, thus indicating that the tape speed adjacent machine reel 11 is slower than the tape speed adjacent capstan 18, this in turn indicating that the loop of tape in column 17 is moving in an upward direction.

The output of the logic circuit shown in FIG. 8 is a negative OR gate 48 whose output conductor 49 is negative whenever it is necessary to institute a capstan coast mode of operation. As can be seen from FIG. 3, there are two conditions when a capstan coast mode of operation is required. One of these conditions is provided by positive AND gate 50 of FIG. 8 and the other condition is provided by positive AND gate 51. Referring to gate 50, whenever conductors 44 and 45 are both positive, indicating that the tape loop is below sensor R2 and that the file reel is slow, a positive output exists on conductor 52. This output is inverted by inverter 53 and a negative output exists on conductor 54, thus causing conductor 49 to go negative. Referring to AND gate 51, whenever conductors 46 and 47 are both positive, indicating that the tape loop is above sensor L1 and that the machine reel is slow, the output on conductor 55 is positive. This positive voltage is inverted by inverter 56 and a negative voltage appears on conductor 57, thus causing conductor 49 to go negative. In either event, a capstan coast mode of operation is instituted, as required by the table of FIG. 3. Again, for purposes of simplicity, the complete combinational logic network 43 has not been disclosed since such a network can take many forms, as well known to those of ordinary skill in the art.

The output of the motor control logic networks 22, 23 and 43 exist on conductors 58, 60 and 59, which conductors may in fact each be a plurality of conductors connected to motor driver networks 61, 62 and 63 respectively.

While these motor driver circuits may take many forms, an exemplary driver circuit is shown in FIG. 7. FIG. 7 discloses a four transistor bridge network wherein transistors 64, 65, 66 and 67 operate in an on-off switching mode to reversibly energize motor 68. In this network, transistors 64 and 67 may be switched to a fully conductive state when it is desired to drive motor 68 in a direction so as to move tape in a reverse or rewind direction. A coast mode of operation would then be instituted by turning transistors 64 and 67 off. In order to brake motor 68, transistor 66 could be switched on; or as a first alternative, transistors 66 and 67 could both be switched on; or as a third alternative, transistors 65 and 66 could be switched on to reverse energize or plug motor 68. While the exact construction of the motor driver circuits 61, 62 and 63 may take many forms, the signals provided on output conductors 58, 59 and 60 are binary in nature and thus on-off operation of motors 12, 19 and 13 results.

FIG. 10 discloses a modified form of capstan motor control logic network which may be used as network 43 of FIG. 1. The nature of this structure is such as to provide essentially digital type control of capstan motor 19. The control order achieved by the structure of FIG. 1, when utilizing the structure of FIG. 10 as the capstan motor control logic network 43 is shown in FIG. 11. A comparison of this figure with FIG. 3 discloses that the control order for the reel motors is not changed. However, the control order for capstan motor 19 provides for incrementally increasing the capstan speed each time that both reel motors catch up with the capstan, meaning that both output conductors 29 and 31 of frequency comparators 28 and 27 are positive. In this manner, the capstan speed incrementally increases until such time as one or both of the reel motors no longer can keep up with the capstan motor. When this happens, one of the output conductors 30 and 32 of comparators 28 and 27 becomes positive at the same time that the tape loop in an associated column moves to a given zone, this being the zone above L1 for machine column 17 and the zone below R2 for file column 15.

Referring to FIG. 10, capstan motor driver 62 is controlled by a capstan speed servo network 69 which receives as a capstan speed reference signal 70 as first input and a signal on conductor 71 indicative of the actual capstan speed as a second input. Servo network 69 is effective in a manner well known to those of ordinary skill in the art to compare the signals on conductors 70 and 71 to produce a capstan speed in accordance with this reference signal.

The signal level on conductor 70 is incrementally changed by reversible counter 73 having an up input 74 and a down input 75. Up input 74 is energized to advance counter 73 by means of positive AND gate 76. Down input 75 is energized, to decrement counter 73, by means of positive OR gate 77. AND gate 76 is provided with three inputs on conductors 78, 79 and 80. Conductor 80 is positive whenever output conductor 29 of frequency comparator 28 is positive, indicating that the file is fast and that the tape loop in column 15 is moving in a downward direction. Conductor 79 is positive whenever output conductor 31 of frequency comparator 27 is positive, indicating that the tape loop in column 17 is moving in a downward direction. Conductor 78 is positive whenever the tape loop in column 17 is above sensor L1 or the tape loop in column 15 is below sensor R2. The signal on conductor 78 is provided by positive OR gate 81 and inverter 82. The input to OR gate 81 is provided on conductors 83 and 84. Conductor 83 is positive whenever the tape loop in column 17 is above sensor L1, and conductor 84 is positive whenever the tape loop in column 15 is below sensor R2. When one or both of the conductors 83 or 84 is positive, output conductor 85 of gate 81 is positive. This positive voltage is inverted and conductor 78 becomes negative to inhibit gate 76 and thereby prevent the response of up input 74 to a positive input on conductors 79 and 80. However when the tape loop is below sensor L1 and above sensor R2, each time that conductors 79 and 80 both become positive, counter 73 increments one step and the capstan speed is advanced a single step. As a result, the capstan speed incrementally advances step by step until such time as the capstan has achieved a speed wherein the reel motors no longer are able to move the tape adjacent the reels faster than the capstan is moving tape. When this happens, the tape loop in column 17 will either move above sensor L1 or the tape loop in column 15 will move below sensor R2, depending upon which of the two motors 13 or 12 is the slowest motor. When this occurs, one of the conductors 86 or 87 will become positive. This positive input to OR gate 77 decrements counter 73 by one step by virtue of down input 75. Thus, the speed reference signal on conductor 70 is decreased by one step and the capstan speed is decreased allowing the tape loops in the columns to be properly positioned.

The logic circuit disclosed in FIG. 10 again is not the complete logic circuit which would be utilized for logic network 43 of FIG. 1 to satisfy the requirements of FIG. 11. For purposes of simplicity, a portion of a relatively simple logic network is disclosed to facilitate the understanding of the control order disclosed in FIG. 11.

When the amount of tape remaining on machine reel 11 decreases to a relatively small amount, tape radius sensor 88 responds to the terminal portion of the rewind interval to provide a signal on conductor 34 which modifies the control of the reel motors and the capstan motors to that shown in the control order diagram of FIG. 4. For the remainder of the rewind operation, the reel motor whose dynamic braking has the least effect in slowing the motor has the effect of controlling the capstan speed.

For example, if machine reel motor 13 has the weaker braking effect, the loop 21 oscillates about sensor L2 and motor 13 is almost continuously braked. At the same time, file reel motor 12 alternately operates in a brake-coast-drive mode of operation and capstan motor 19 alternately operates in a drive-coast mode of operation. On the other hand, if file reel motor 12 has the weaker braking effect, loop 20 oscillates about sensor R2 and motor 12 is almost continuously braked. Machine reel motor 13 then operates in a drive-coast-brake mode of operation and capstan motor 19 again operates in a drive-coast mode of operation.

As can be seen from FIG. 4, a capstan coast command may occur from one column at the same time that a capstan drive command results from the other column. For example, when the tape loop in machine column 17 is below L2 and output conductor 32 of comparator 27 is positive indicating that the tape at reel 11 is moving slower than the tape at capstan 18, a capstan coast command originates. However, a capstan drive command can concurrently occur if the loop of tape in file column 15 is above sensor R1 and output conductor 29 of comparator 28 is positive. Whenever such an ambiguity occurs, a capstan drive command takes precedence over the capstan coast command.

While the invention has been particularly shown and described with reference to preferred embodiments thereof, it will be understood by those skilled in the art that various changes in form and details may be made therein without departing from the spirit and scope of the invention.

What is claimed is:

1. In a magnetic tape unit wherein rewind is accomplished by a motor control means which institutes backward rotation of a file reel motor and its reel, a capstan means and a machine reel motor and its reel, and in which the rotational control of said motors by said motor control means is controlled by two tape loop position sensors located in each of a file vacuum column and a machine vacuum column to define an upper, an intermediate and a lower zone in each column, said motor control means normally being effective to maintain the tape loop in the lower zone of said file vacuum column and in the upper zone of said machine vacuum column during such rewind, the improvement comprising;

first and second tape speed comparing means associated with said file and said machine vacuum columns respectively and responsive to the relationship of the tape speed on the reel side of a column to the tape speed on the capstan means side of a column to selectively provide a reel-fast or a reel-slow output for each reel, and means connecting the outputs of said first and second speed comparing means to said motor control means in a manner to produce the following control order for said machine reel motor;

1. a drive mode when a machine reel-slow output occurs and the tape loop in the associate column is in said upper or intermediate zones,
2. a drive mode when a machine reel-fast output occurs and the tape loop is in said upper zone,
3. a brake mode when the tape loop is in said lower zone, and
4. a coast mode when a machine reel-fast output occurs and the tape loop is in said intermediate zone;

to produce the following control order for said file reel motor;

1. a drive mode when a file reel-slow output occurs and the tape loop in the associate column is in said lower or intermediate zones,
2. a drive mode when a file reel-fast output occurs and the tape loop is in said lower zone,
3. a brake mode when the tape loop is in said upper zone, and
4. a coast mode when a file reel-fast output occurs and the tape loop is in said intermediate zone;

and to produce the following control order for said capstan means, a coast mode when 1. a machine reel-slow output occurs and the tape loop is in the upper zone of said machine column, or
2. a file reel-slow output occurs and the tape loop is in the lower zone of said file column, and a drive mode under all other conditions.

2. A magnetic tape unit as defined in claim 1, including;

radius sense means associated with said machine reel to signal the terminal portion of rewind, and means connecting the output of said radius sense means to said motor control means in a manner to produce the following control order during the terminal portion of rewind, the control order for said machine reel motor providing 1. a drive mode when the tape loop in the associated column is in said upper zone,
2. a brake mode when the tape loop is in said lower zone,
3. a brake mode when a machine reel-fast output occurs and the tape loop is in said intermediate zone, and
4. a coast mode when a machine reel-slow output occurs and the tape loop is in said intermediate zone;

the control order for said file reel motor providing, 1. a drive mode when the tape loop in the associated column is in said lower zone,
2. a brake mode when the tape loop is in said upper zone,
3. a brake mode when a file reel-fast output occurs and the tape loop is in said intermediate zone, and
4. a coast mode when a file reel-slow output occurs and the tape loop is in said intermediate zone;

and the control order for said capstan means providing a drive mode when 1. a machine reel-fast output occurs and the tape is in the lower zone of said machine column, or
2. a file reel-fast output occurs and the tape loop is in the upper zone of said file column, and a coast mode under all other conditions.

3. In a magnetic tape unit having a file reel, a bidirectional motor connected thereto, and a file vacuum column disposed adjacent thereto; a machine reel, a bidirectional motor connected thereto, and a machine vacuum column disposed adjacent thereto; and bidirectionally rotatable capstan means intermediate the vacuum columns, the improvement comprising;

control means having a binary output and effective to institute a rewind mode of operation of said file and machine motors and of said capstan means whereby the tape is moved from said machine reel to said file reel, first and second logic means responsive to the output of said control means and connected to control said file and machine motors respectively, first and second sensing means associated with said file and machine vacuum columns respectively and operable to sense the position of a tape loop therein, means connecting said first and second logic means respectively to institute the following modes of operation of said file and machine motors:

1. a brake mode of operation for said file motor when the tape loop in said file column is above a given level, (2) a drive mode of operation for said file motor when the tape loop in said file column is below a given level, (3) a brake mode of operation for said machine motor when the tape loop in said machine column is below a give level, and (4) a drive mode of operation for said machine motor when the tape loop in said machine column is above a given level;

first and second speed comparing means responsive to the speed of the tape on opposite sides of said file and machine columns respectively, and means connecting said first and second speed comparing means to said first and second logic means respectively to:

1. inhibit the drive mode of operation of said file motor when said file motor is removing tape from said file column faster than said capstan means is moving tape thereinto, and
2. inhibit the drive mode of operation of said machine motor when said machine motor is moving tape into said machine column faster than said capstan means is removing tape therefrom.

4. A magnetic tape unit as defined in claim 3 including third logic means responsive to the output of said control means, and connected to control said capstan means, and means connecting said first and second sensing means to said third logic means to inhibit drive of said capstan means when 1. said capstan means is moving tape into said file column faster than said file motor is removing tape therefrom, and the tape loop in said file column is below a given level, or
2. said capstan means is moving tape out of said machine column faster than said machine motor is moving tape thereinto, and the tape loop in said machine column is above a given level.

5. A magnetic tape unit as defined in claim 3, including;

radius sense means associated with said machine reel to provide a binary output indicative of the terminal portion of rewind, and means connecting the output of said radius sense means to said first and second logic means to institute the following modes of operation of said file and machine motors during the terminal portion of rewind:

1. a brake mode of operation for said file motor when the tape loop in said file column is above a given level, (2) a drive mode of operation for said file motor when the tape loop in said file column is below a given level (3) a brake mode of operation for said machine motor when the tape loop in said machine column is below a given level, and (4) a drive mode of operation for said machine motor when the tape loop in said machine column is above a given level;

said first and second speed comparing means functioning during the terminal portion of rewind to;

1. inhibit the brake mode of operation of said file motor when said capstan means is moving tape into said file column faster than said file motor is removing tape therefrom, and
2. inhibit the brake mode of operation of said machine motor when said capstan means is moving tape out of said machine column faster than said machine motor is moving tape thereinto.

6. A magnetic tape unit as defined in claim 4, including;

radius sense means associated with said machine reel and effective to provide a binary output, one state of which is indicative of the terminal portion of rewind, and means connecting the output of said radius sense means to said third logic means to institute a coast mode of operation of said capstan means during the terminal portion of rewind said coast mode being replaced by a drive mode whenever 1. the tape loop in said file column is above a given level and said file motor is removing tape from said file column faster than said capstan means is moving tape into said file column, or
2. the tape loop in said machine column is below a given level and said machine motor is moving tape into said machine column faster than said capstan means is moving tape out of said machine column.

7. In a magnetic tape unit having a file reel, a machine reel and a single capstan disposed therebetween, wherein high speed rewind is accomplished by instituting backward rotation of the two reels and the capstan, the improvement comprising;

means operable upon the occurrence of a rewind command to institute backward rotation of the capstan at a low speed, and means responsive to the speed of the tape at the capstan and adjacent each of the reels to incrementally advance the speed of the capstan each time the speed of the tape adjacent each of the reels is equal to or greater than the speed of the tape adjacent the capstan, whereby the eventual tape speed of said high speed rewind is determined by the slowest reel motor or the top speed of the capstan.

8. A magnetic tape unit as defined in claim 7 wherein said file reel and machine reel are connected to motors which are controlled by on-off servos, and wherein said servos are placed in an ON condition upon the occurrence of a rewind command.

9. A magnetic tape unit as defined in claim 8 including a file vacuum column and a machine vacuum column disposed between the corresponding reel and the capstan, and including means responsive to the position of the loop of tape in each column to inhibit the ON condition of the associated servo and institute a brake condition therefore when the loop of tape becomes too long in said machine column or too short in said file column.

10. A magnetic tape unit as defined in claim 9 including means responsive to either too short a loop in said machine column or too long a loop in said file column to decrement the speed of the capstan.

11. In a magnetic tape unit having a file reel motor and an associated reel, a machine reel motor and an associated reel, a capstan means and an associated capstan motor, a file buffer intermediate said file reel and said capstan means, and a machine buffer intermediate said machine reel and said capstan means, wherein high speed tape movement is accomplished by instituting high speed rotation of the capstan means, and in which a given maximum quantity of tape is maintained in the buffer which is receiving tape from said capstan means, and a given minimum quantity of tape is maintained in the buffer which is supplying tape to said capstan means, the improvement comprising:

two tape quantity sensing means, one associated with each of said two buffers and responsive to the quantity of tape therein to provide an output indicative of the relationship of the quantity of tape in the buffer to said given quantity, two tape quantity-change sensing means, one associated with each of said two buffers and responsive to changes in the quantity of tape therein to provide an output indicative of an increasing or a decreasing quantity of tape in the buffer, two reel servo means, one connected in controlling relation to each of said file and machine reel motors and receiving as input commands the output of the tape quantity sensing means and the tape quantity-change sensing means associated with said file and said machine buffers, respectively, means connecting only the associated tape quantity means in controlling relation to a reel servo means to control the associated reel motor in a drive mode, independent of the output of the associated tape quantity-change sensing means, when the quantity of tape in the buffer receiving tape from said capstan means is greater than said given maximum quantity, or when the quantity of tape in the buffer supplying tape to said capstan means is less than said given minimum quantity, capstan servo means connected in controlling relation to said capstan motor and receiving as input commands the outputs of said two tape quanity sensing means and the outputs of said two tape quantity-change sensing means, and means connecting said two tape quantity sensing means and said two tape quantity-change sensing means in controlling relation to said capstan servo means and controlling said capstan motor in a coast mode whenever the quantity of tape in the buffer receiving tape from said capstan means is greater than said given maximum quantity and the quantity of tape therein is increasing, or whenever the quantity of tape in the buffer supplying tape to said capstan means is less than said given minimum quantity and the quantity of tape therein is decreasing.

12. A magnetic tape unit as defined in claim 11, including:

means connecting both the associated tape quantity sensing means and the associated tape quantity-change sensing means in controlling relation to a reel servo means and varying the drive duty cycle of the associated reel motor when the quantity of tape in the associated buffer is substantially equal to said given quantity, and means connecting only said two tape quantity sensing means in controlling relation to said capstan servo means and controlling said capstan motor in a drive mode whenever the quantity of tape in both buffers is substantially equal to said given quantity.

13. A magnetic tape unit as defined in claim 12, including:

reel quantity sensing means operable during high speed tape movement from said machine reel to said file reel, said reel quantity sensing means being responsive to a given minimum quantity of tape on said machine reel to provide an output signal, and means connecting the output of said reel quantity sensing means in controlling relation to said capstan servo means to modify the control of said capstan motor, said capstan servo means thereafter controlling said capstan motor in a drive mode only when the quantity of tape in said machine buffer is greater than said given minimum quantity and the quantity of tape therein is increasing, or the quantity of tape in said file buffer is less than said given maximum quantity and the quantity of tape therein is decreasing.

14. A magnetic tape unit as defined in claim 13, including:

means connecting the output of said reel quantity sensing means in controlling relation to said two reel servo means to modify the control of said two reel motors, said reel servo means thereafter controlling said machine reel motor in a drive mode only when the quantity of tape in said machine buffer is less than said given minimum quantity, and controlling said file reel motor in a drive mode only when the quantity of tape in said file buffer is greater than said given maximum quantity.

* * * * *